Sept. 23, 1969     H. D. KELLEY     3,468,410

CONVEYOR

Filed April 18, 1967     2 Sheets-Sheet 1

INVENTOR
Hugh D. Kelley

BY Schmidt, Johnson, Hovey
Williams & Bradley
ATTORNEYS

Sept. 23, 1969    H. D. KELLEY    3,468,410
CONVEYOR

Filed April 18, 1967    2 Sheets-Sheet 1

INVENTOR
Hugh D. Kelley

BY Schmidt, Johnson, Hovey
Williams & Bradley ATTORNEYS

3,468,410
CONVEYOR
Hugh D. Kelley, Enterprise, Kans., assignor, by mesne assignments, to Ehrsam Company, Abilene, Kans., a corporation of Delaware
Filed Apr. 18, 1967, Ser. No. 631,644
Int. Cl. B65g 19/00
U.S. Cl. 198—173                    5 Claims

ABSTRACT OF THE DISCLOSURE

Material moving apparatus is provided with an endless conveyor having flights which extend entirely across the bottom of a material-receiving trough. The trough is provided with vertical sides and has a transversely V-shaped bottom, the flights being complementally V-shaped and in wiping engagement with the bottom. The material in the trough is advanced as a moving stream and may have a depth substantially greater than the height of the flights, thereby providing the apparatus with materially increased capacity limited only by the frictional forces developed by the moving material at the interior surfaces of the sides of the trough.

---

Drag and flight conveyors for grain and other particulate materials have a capacity limited by the height of the conveyor flights. Although such conveyors are capable of handling a material level somewhat above the flights, as the depth increases a level is ultimately reached where the material no longer flows as a stream or current. This establishes the maximum capacity of the conveyor, requiring heretofore that the width of the conveyor trough or the height of the flights be increased in order to provide additional capacity.

It is, therefore, the primary object of this invention to provide material moving apparatus which, unlike the drag or flight conveyor, is capable of handling a material height substantially above the flights of the apparatus, in order to provide increased capacity without materially increasing the physical size of the conveyor structure.

As a corollary to the foregoing object, it is an important aim of the instant invention to provide material moving apparatus having a novel bottom configuration which both increases its capacity and imparts desirable operational characteristics to the apparatus to be discussed hereinafter.

Furthermore, it is a specific and important object of this invention to provide an improved material handling apparatus as aforesaid in which the flights are held against the bottom of the conveyor trough by a downward reaction as the flights are forced through the material to advance the same, thereby obviating any tendency of the flights to separate from the bottom or become misaligned.

Another important object is to provide such an apparatus which is self-cleaning by virtue of a wiping action of the flights as the same advance along the bottom of the conveyor trough, thereby minimizing possible contamination.

Still another important object is to provide an endless conveyor having upper and lower stretches, in which the lower stretch is supported exclusively by the conveyor flights so that the conveyor chains are not subject to wear except at the required drive and idler sprockets around which the chains are trained.

Yet another specific and important object, in connection with the reduction of the number of wear points, is to provide such a conveyor in which the wear on the upper stretch thereof is confined to replaceable shoes joining the flights to the conveyor chains.

Additionally, an important object of this invention is to provide a bottom configuration for a conveyor trough particularly adapted to the utilization of replaceable abrasion-resistant liners therewith for the purpose of extending the life of the conveyor structure.

Further, it is a specific object of the invention to eliminate material carry-over, i.e. the transporting of material by the conveyor past the discharge outlet, in order to further reduce possible causes of contamination of the apparatus. This is particularly important in the handling of various types of grains where it is requisite that, after a particular run, the apparatus be free of residual grain and clean for a subsequent run.

Still another important object is to provide a conveyor housing or tube having an interchangeable bottom and top, in order that a worn bottom may be replaced by an unworn top, and the worn bottom then used as the top to extend the usable life of the apparatus before replacement parts are required.

To further eliminate possible problems of contamination and provide a means of controlling the ingress of material into the apparatus, it is an important aim of the invention to provide a feeder for a horizontal conveyor in which the flights thereof carried by the upper stretch of the conveyor are utilized to sweep the material from a platform through an opening of controllable size for gravitation onto the bottom of the conveyor trough.

In the drawings:

FIG. 4 is an enlarged, sectional view taken along line 4—4 of FIG. 1;

FIG. 5 is a detail view of a portion of the structure shown in FIG. 4;

FIG. 6 is a longitudinal sectional view of the feeder section of the apparatus, taken along line 6—6 of FIG. 7; and FIG. 7 is a sectional view taken along line 7—7 of FIG. 6.

Figure 1:
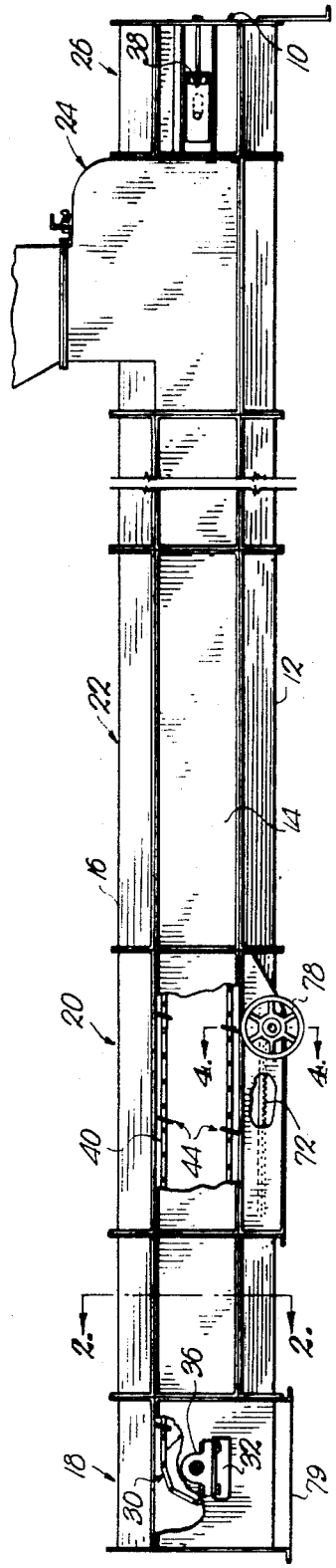
FIGURE 1 is a side elevational view of the apparatus, certain portions of the housing being broken away to reveal details of construction.

Referring initially to FIG. 1, the material moving apparatus of the instant invention is provided with an elongated, sectional housing or tube in the form of a trough 10 having a bottom 12 and a pair of vertical sides 14, covered by a top 16 identical to bottom 12 in all respects except inverted with respect to bottom 12. The various sections of the apparatus include, from left to right, a head section 18, a discharge section 20, an intermediate section 22, a feeder section 24, and a tail section 26.

Figure 2:
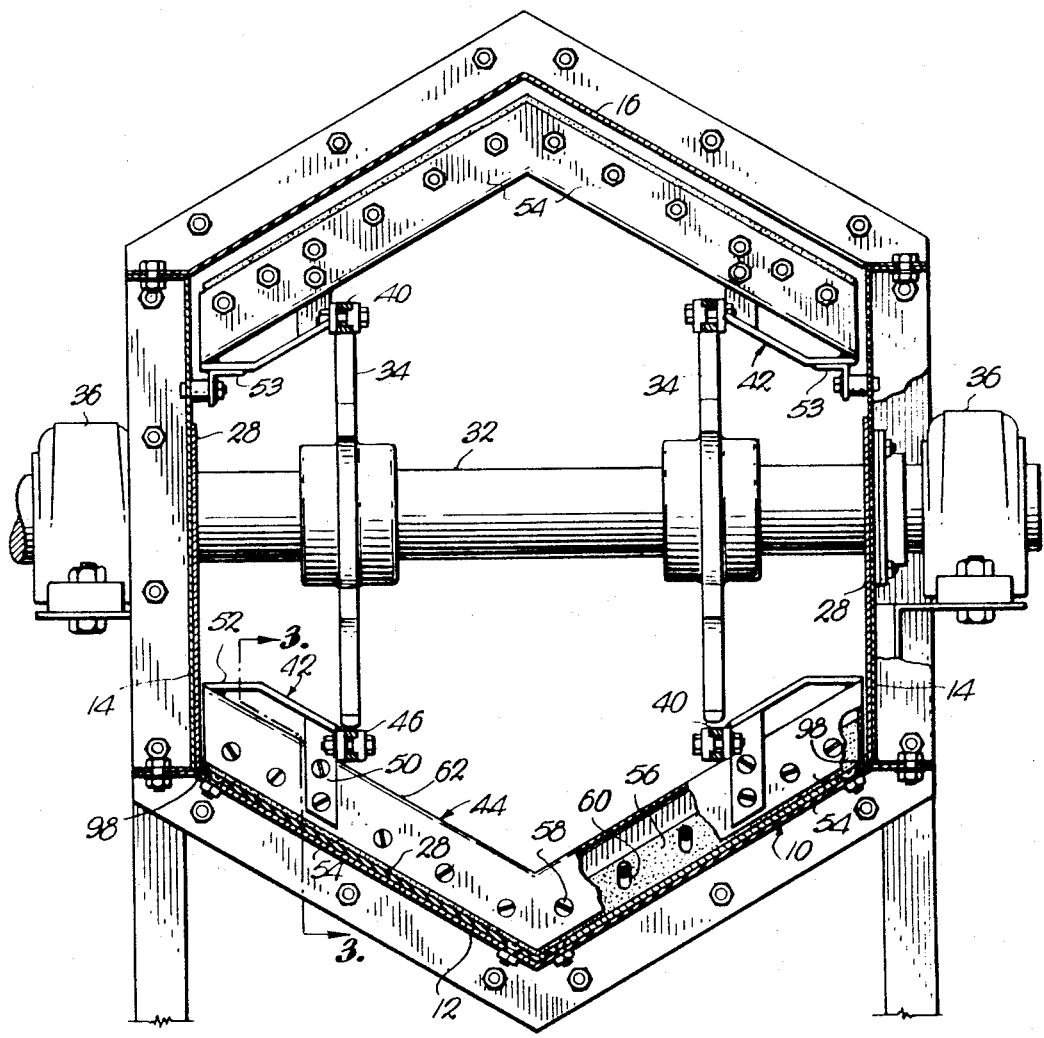
FIG. 2 is an enlarged, sectional view taken along line 2—2 of FIG. 1.
Figure 3:
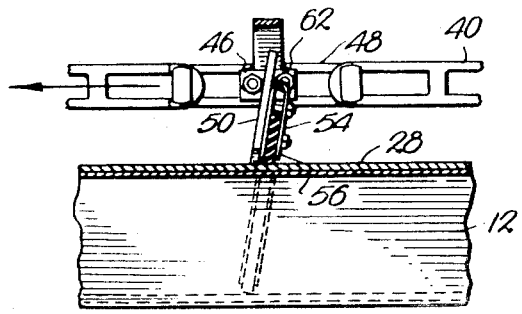
FIG. 3 is a sectional view taken along line 3—3 of FIG. 2.

The other figures show the material moving apparatus in detail, and clearly illustrate that bottom 12 is of transversely V-shaped configuration and releasably secured to the sides 14 by suitable bolt and nut interconnections spaced along mating flanges of bottom 12 and sides 14. Similarly, top 16 is bolted to the upper flanges of sides 14. In FIGS. 2 and 3, abrasion-resistant, steel liners 28 are shown comprising a part of bottom 12 and both of the sides 14. As illustrated, the liners are bolted to backing plates and, in the case of bottom 12, are readily removable to permit replacement. It should be understood that, in the interest of clarity, the bottom 12 and sides 14 are illustrated as comprising single plate members without liners in FIGS. 4–7, since the smaller scale does not permit individual illustration of the backing plates and liners.

An endless conveyor 30 is disposed within the confines of trough 10 and top 16 and includes a drive shaft 32 in head section 18 having a pair of sprocket wheels 34 rigidly secured thereto, shaft 32 being mounted in suitable bearings 36 and coupled with a prime mover (not shown). An idler shaft and associated sprocket wheels (not shown) are mounted within tail section 26 and shiftable longitudinally of trough 10 by adjustable take-up means 38 in order to control the slack in a pair of endless chains 40 trained around sprocket wheels 34 and the sprocket wheels in tail section 26.

Chains 40 are preferably of the rivetless type, assembled from forged steel center links, sidebars and pins. A radius on the upper and lower surfaces of the links and sidebars prevents material carry-over to be discussed more fully hereinafter. Particularly in FIGS. 2 and 3, it may be seen that mounting shoes 42 are spaced along chains 40 and secure a series of spaced, V-shaped flights 44 to the chains 40. Each shoe 42 is provided with a pair of clamping plates 46 which engage opposite sides of a center link 48 of the chain 40, drawbolts being employed to rigidly clamp plates 46 to link 48 with the shoe 42 in approximately centered relationship with respect to link 48. A rigid strap 50 forms a part of shoe 42 and is bolted to flight 44. The body of the shoe 42 extends to the end of the flight 44 to which strap 50 is bolted and presents a flat, horizontal outer surface 52. A pair of rails 53 are secured to sides 14 and extend longitudinally of conveyor 30 from head section 18 to tail section 26, each rail 53 comprising an angle member upon which the shoes 42 of the upper stretch of conveyor 30 ride with their surfaces 52 in sliding engagement therewith.

Each flight 44 comprises a pair of elongated blades 54 integrally joined at their inner extremities to present the V-shaped flight configuration. As is particularly evident in FIG. 3, each blade 54 is transversely U-shaped, a wiper element 56 being sandwiched between the parallel legs of the blades 54 of each flight 44. A series of bolts 58 in flight 44 extend through slots 60 in wiper element 56 to secure the latter in place and permit adjustment of the vertical position thereof.

Each flight 44 traverses bottom 12 entirely thereacross from side-to-side, each end of the flight overlapping the proximal side 14 as is clear in FIGS. 2 and 7. Only sufficient clearance remains between the ends of flights 44 and sides 14 to permit flights 44 to move freely along bottom 12 without scraping sides 14. The wiper element 56 extends from the lower margin of the legs of blades 54 and engages the upper surface of bottom 12 to wipe the surface clean as the flight passes thereover. The wiper elements 56 are preferably of nonmetallic composition such as fiber impregnated with rubber or similar substance. As the wiper elements 56 become worn, they are advanced from between the legs of blades 54 by loosening bolts 58 and retightening the same, until such time as replacement is required. In the event that variations in the conveyor bottom 12 are present, the wiper elements 56 wear into such variations to assure that a clean wiping action is produced.

Viewing the lower stretches of chains 40 (FIG. 3) the strap 50 of each shoe 42 is inclined away from the direction of movement of the conveyor at an angle with the vertical equal to approximately seven and one-half degrees. Thus, the flights 44 of the lower stretch of the conveyor plow into material on bottom 12, the resistance of the material producing a downward reaction which holds the wiping edges of flights 44 in firm contact with the upper surface of bottom 12. This action, in conjunction with the V-shaped configuration of bottom 12 and flights 44, assures that the flights will not work up in the material or become misaligned due to the forces placed thereon by the resistance of the material. Additionally, note that the bight of each of the flight blades 54 has a convex outer surface 62, the latter facing upwardly when the flight is traveling on the lower stretch of the conveyor. Thus, material will not tend to adhere or collect on the upper surfaces of flights 44, thereby precluding material carry-over by flights 44.

The significance of material carry-over is readily appreciated by considering the discharge section 20 and its function. FIGURE 4 is a cross section through the lower stretch of conveyor 30 in discharge section 20 and clearly reveals that bottom 12 therein is provided with a discharge opening 64 overlying a slide gate 66 which rides upon a pair of guides 68 secured to extensions 70 of respective sides 14 (see also FIG. 5).

A pair of racks 72 extend along the central, lowermost portion of gate 66 and are in mesh with a pair of pinions 74 keyed to a shaft 76 operated by handwheel 78. Thus, gate 66 may be manually shifted to an open position with respect to discharge opening 64, thereby permitting the material flowing in trough 10 to gravitate through opening 64 to a desired delivery location. If material carry-over were permtted, such material would subsequently be discharged through an outlet 79 in head section 18 where conveyor 30 undergoes the change in direction, the transition of the position of flights 44 from the lower stretch to the upper stretch of conveyor 30 causing the material carried thereon to fall therefrom. Outlet 79 is conventionally in communication with a bin or the like (not shown). Any material emanating from outlet 79 would present a substantial problem of contamination of the material in the bin since the material in the bin may very likely be of a type different from that handled by conveyor 30. Similarly, any material carried past opening 64 by chains 40 would also fall through outlet 79 in head section 18.

Referring particularly to FIGS. 6 and 7, feeder section 24 comprises a hopper 80 which directs the material through top 16 and onto an elongated platform 82 supported by sides 14 beneath the upper stretch of conveyor 30. Platform 82 extends longitudinally of trough 10 and top 16, and has a central, raised, sloping portion 84 extending longitudinally thereof. As viewed in cross section (FIG. 7) it may be seen that raised portion 84 slopes downwardly on both sides from an apex aligned with the apexes of the flights 44 of the upper stretch of conveyor 30. Portion 84 is flanked by a pair of flat platform sections 86 extending laterally into close proximity with adjacent sides 14.

Every third or fourth flight 44 is provided with a pair of cleaning plates 88 which are attached to the outer end portions of the flight, each plate 88 being notched at 90 to provide clearance for the adjacent conveyor chain 40. As is clear in FIG. 7, the cross-sectional configuration of platform 82, including raised portion 84 and the flat sections 86, is complemental to the configuration defined by each flight 44 having the cleaning plates 88 mounted thereon. Wiping engagement of flights 44 with the upper surface of raised portion 84 is not required since the sloping surface presented by portion 84 precludes material buildup thereon. Cleaning plates 88, however, extend into sufficently closely spaced relationship to flat sections 86 to assure that at the end of a run, all material remaining on sections 86 will be pushed off of the end of platform 82 as flights 44 advance.

A control valve for feeder section 24 is provided by a strike-off 92 in the form of a vertically shiftable plate having a V-shaped bottom edge complemental to the configuration of flights 44. Strike-off 92 is mounted adjacent the discharge end of platform 82 and is vertically shiftable in a pair of side guides 94. Setscrews 96 may be employed to hold strike-off 92 at the desired elevation.

In operation, the height of strike-off 92 is set at a desired level to limit the maximum rate of discharge of material onto the bottom 12 of trough 10. Material discharges from platform 82 by a sweeping action of flights 44 as the latter pass along platform 82 toward tail section 26. The material is immediately advanced in the opposite direction by the flights 44 of the lower stretch of conveyor 30, the material ultimately being delivered to the discharge section 20 of the material mover where it gravitates through opening 64.

As is clear in FIGS. 2 and 7, a longitudinal line of demarkation 98 is formed in trough 10 at the corner presented at the juncture of bottom 12 with each side 14. Thus, the two parallel lines of demarkation 98 define the internal, longitudinal margins of bottom 12 and the lower, longitudinal edges of the two sides 14.

The frontal surface area of the blades 54 of each flight 44 is relatively small; hence, if the surface areas of the flights were relied upon in the instant invention as the sole means of advancing the material along trough 10, the capacity of the apparatus would be severely limited. The effect of the advancing flights 44 of the lower stretch of conveyor 30, therefore, is to impart movement to the material as a body and cause the material to advance in a continuous stream. Since each flight 44 extends entirely across bottom 12, the material is prevented from developing a frictional force at the interface with bottom 12 in opposition to the movement imparted to the material by flights 44. Therefore, drag or stacking of the material is precluded and the opposition to flow is limited to the friction of the material against sides 14, the latter being vertical, or nearly vertical, to reduce the side friction to a minimum. The resultant maximum depth of material in trough 10 is substantially increased as compared with drag or flight conveyors, thereby providing greater capacity without a corresponding increase in the cross-sectional area of the housing. Flights 44 need not have substantial bulk since flights having large surface areas are not required in order to obtain the material moving action discussed above.

Additionally, the V-shaped configuration of bottom 12 increases the capacity of the apparatus without increasing the vertical dimensions of sides 14. This configuration also facilitates the self-cleaning action provided by wiper elements 56 and in cooperation with the downward reaction produced by the inclination of flights 44 which holds the latter against bottom 12, precludes any tendency of flights 44 to twist or become misaligned transversely of the trough under the influence of unequal forces against blades 54. As the surface of bottom 12 is subject to abrasive wear when the material moves thereover, ultimately the bottom liner 28 and even the bottom 12, may become worn. When this occurs, the liners 28 are replaceable and bottom 12 and top 16 may be interchanged since these two components are identical.

It will be noted in the figures that the only wear points of the conveyor chains 40 are at the sprocket wheels 34 and the sprockets (not shown) in the tail section 26. The lower stretches of chains 40, between head section 18 and tail section 26, are supported solely by the lower flights 44. The upper run of conveyor 30 between the head and tail sections is supported entirely by rails 53 upon which shoes 42 slide. Thus, the apparatus is rendered relatively maintenance free, and shoes 42 may be readily replaced when worn.

Having thus described the invention, what is claimed as new and desired to be secured by Letters Patent is:

1. A material mover comprising:
an elongated, material-receiving trough having a transversely V-shaped bottom and a pair of spaced, vertical sides extending upwardly from the lateral edge of said bottom; and
an endless conveyor in said trough for advancing material longitudinally thereof,
said conveyor having a plurality of spaced flights having V-shaped edges disposed to move along said bottom from one end of the latter to the opposite end thereof,
each flight traversing said bottom entirely thereacross from one of said sides to the other of said sides,
each flight having a concavity opposite said edge thereof, said bottom having an upper surface sloping upwardly and outwardly from its longitudinal axis toward said sides complementally with said edges,
each flight including a pair of elongated blades interconnected at the apexes of the flights,
each flight having a pair of opposed ends,
said ends of each flight overlapping the lowermost margins of proximal sides during movement of the flights along said bottom,
said conveyor including an endless, movable member and structure securing each of said flights, respectively, to said member with the blades thereof inclined toward said one end of the bottom during movement of the flights along the bottom toward said opposite end thereof, whereby the flights plow into the material and are held thereby with said edges in wiping engagement with said surface.

2. The invention of claim 1,
said flights having wiping elements in engagement with the upper surface of said bottom during movement thereof along said surface.

3. The invention of claim 1,
each of said blades being transversely U-shaped and having a bight and a pair of legs receiving a corresponding wiper element therebetween and depending from the bight during movement of the flights along said bottom,
the bight of each blade being provided with a convex outer surface, whereby to eliminate material carry-over.

4. The invention of claim 1:
and an elongated top on said trough releasably secured to said sides and having a normally downwardly facing surface sloping downwardly and outwardly from the longitudinal axis of the top toward said sides,
said bottom being releasably secured to said sides and interchangeable with said top,
said surface of the top, when the latter is removed from the sides and inverted, being identical in configuration to said surface of the bottom whereby, when the bottom becomes worn, it may be replaced by the top and then utilized as the top.

5. A material mover comprising:
an elongated, material-receiving trough having a bottom and a pair of spaced sides extending upwardly from the lateral edge of said bottom;
an endless conveyor in said trough for advancing material longitudinally thereof,
said conveyor having a plurality of spaced flights disposed to move along said bottom from one end of the latter to the opposite end thereof,
each flight traversing said bottom entirely thereacross from one of said sides to the other of said sides, said bottom having an upper surface sloping upwardly and outwardly from its longitudinal axis toward said sides,
said conveyor having a lower stretch adjacent said bottom movable longitudinally of the trough toward said opposite end of the bottom, and an upper stretch above the lower stretch movable in the opposite direction; and
a material feeder spaced above said bottom adjacent said one end thereof,
said feeder including a platform between said stretches and structure for directing the material onto said platform,
said flights sweeping said platform to discharge the material therefrom during movement of the upper stretch in said opposite direction,
said feeder having valve means for controlling said discharge to thereby control the rate at which the material is permitted to gravitate onto said bottom for advancement by the flights toward said opposite end of the bottom,
said platform being provided with a centrally disposed, laterally sloping, raised portion extending longitudinally of the trough, and an outer, flat section on each side of said raised portion, at least certain of said flights being provided with cleaning means for advancing material on said sections in said opposite direction to discharge the same from said platform as the latter is swept.

References Cited

UNITED STATES PATENTS

| | | | |
|---|---|---|---|
| 2,286,580 | 6/1942 | Schroeder | 198—172 |
| 2,552,743 | 5/1951 | Simpson | 198—175 |
| 2,646,157 | 7/1953 | Belt | 198—172 |
| 405,608 | 6/1889 | Selleck | 198—172 |
| 835,288 | 11/1906 | Patterson | 198—54 |
| 688,912 | 12/1901 | Watts | 198—174 |
| 2,545,366 | 3/1951 | Mandryl | 198—168 |
| 3,061,073 | 10/1962 | Wickam | 198—174 |
| 3,111,216 | 11/1963 | Geberin | 198—174 |
| 3,141,545 | 7/1964 | Holland | 198—204 |

RICHARD E. AEGERTER, Primary Examiner